---

United States Patent [19]

Mansfield

[11] Patent Number: 5,026,228

[45] Date of Patent: Jun. 25, 1991

[54] TRUCK TRAILER WITH HYDRAULIC CARGO CONTAINER POSITIONING MECHANISM

[76] Inventor: P. Michael Mansfield, 517 Central, Moses Lake, Wash. 98337

[21] Appl. No.: 202,890

[22] Filed: Jun. 6, 1988

[51] Int. Cl.⁵ .................. B65G 67/02; B60P 1/64
[52] U.S. Cl. .................................. 410/52; 410/90; 296/35.3; 414/349; 414/679
[58] Field of Search .............. 410/52, 54, 55, 88, 410/90, 92; 296/35.3, 35.1; 280/80 B, 405 A, 405 R; 414/349, 584, 679

[56] References Cited

U.S. PATENT DOCUMENTS

| | | | |
|---|---|---|---|
| 1,320,601 | 11/1919 | Caron | 280/405 R |
| 2,428,144 | 9/1947 | Clough | 410/52 X |
| 3,572,563 | 3/1971 | Oliver | 414/679 X |
| 3,618,969 | 11/1971 | Glassmeyer | 280/80 B |
| 4,409,903 | 10/1983 | Wilhelmsson et al. | 414/679 X |
| 4,580,805 | 4/1986 | Bertolini | 280/405 A |
| 4,704,063 | 11/1987 | Updike, Jr. et al. | 414/679 X |
| 4,836,735 | 6/1989 | Dennehy, Jr. et al. | 414/679 X |

FOREIGN PATENT DOCUMENTS 2101555 1/1983 United Kingdom ............... 414/679

*Primary Examiner*—Margaret A. Focarino
*Assistant Examiner*—Dean J. Kramer

*Attorney, Agent, or Firm*—Christensen, O'Connor, Johnson & Kindness

[57] ABSTRACT

A gooseneck truck trailer (13) including a hydraulic mechanism for longitudinally positioning a large cargo container (27) is disclosed. The hydraulic load positioning mechanism includes a horizontal bar (37) and a hydraulic actuator (65). The horizontal bar (37) is located near the rear of the trailer (13) and oriented orthogonal to the longitudinal axis of the trailer. The hydraulic actuator (65) lies along the longitudinal axis of the trailer (13). The hydraulic actuator (65) is oriented such that the outer end of the shaft (39) of the actuator (65) is attached to the bar (37) and the actuator housing is attached to the trailer (13), inwardly of the bar (37). The rear edge of a cargo container (27) to be transported by the trailer (13) is positioned atop, and attached to, the bar (37). The bar (37) and the forward end of the container (27) lie atop strips of low-friction material (63 and 73). As a result, when the shaft (39) of the hydraulic actuator (65) is energized, the container (27) is slid back along the longitudinal axis of the trailer (13). The container (27) is moved between a loading and unloading position whereat the rear entryway of the container (27) is vertically aligned with the rear end (25) of the trailer (13); and, a traveling position whereat the container (27) is centered between the trailer's tandem rear wheels (29) and the rear wheels (31) of the tractor (15) pulling the trailer (13).

3 Claims, 2 Drawing Sheets

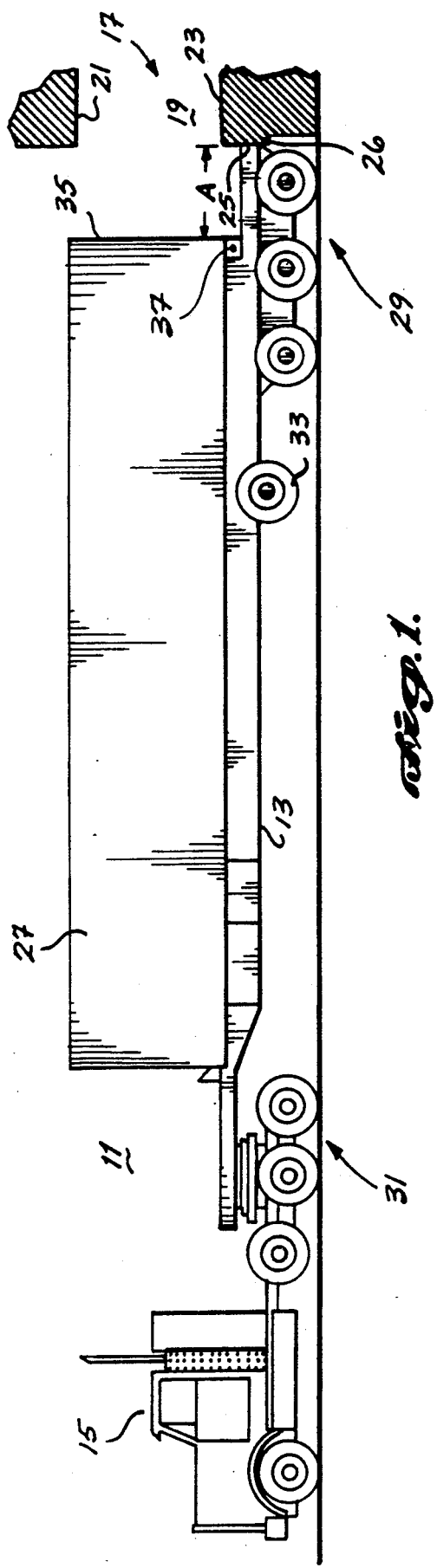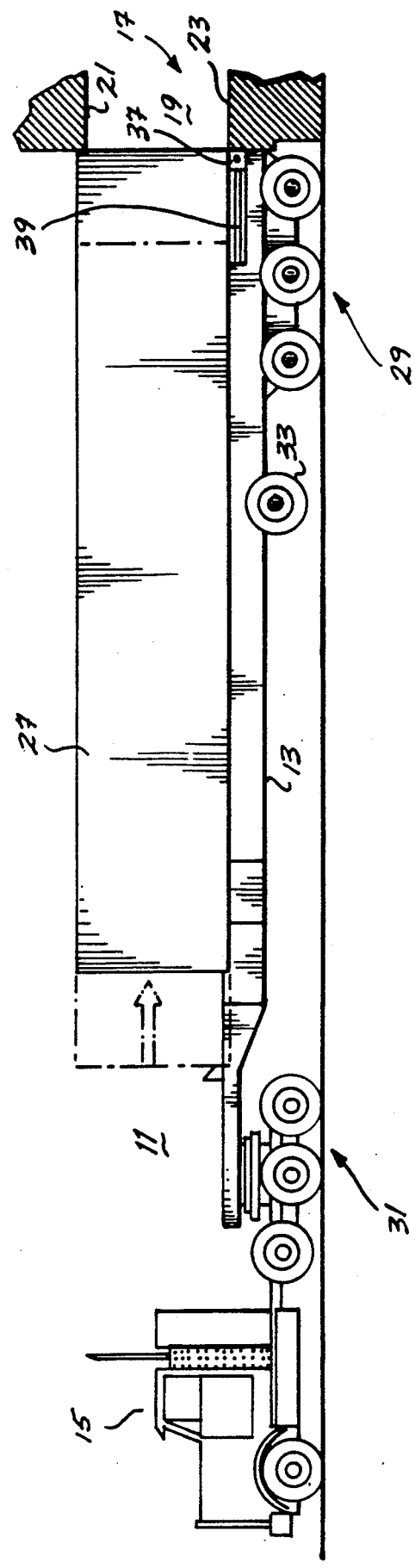

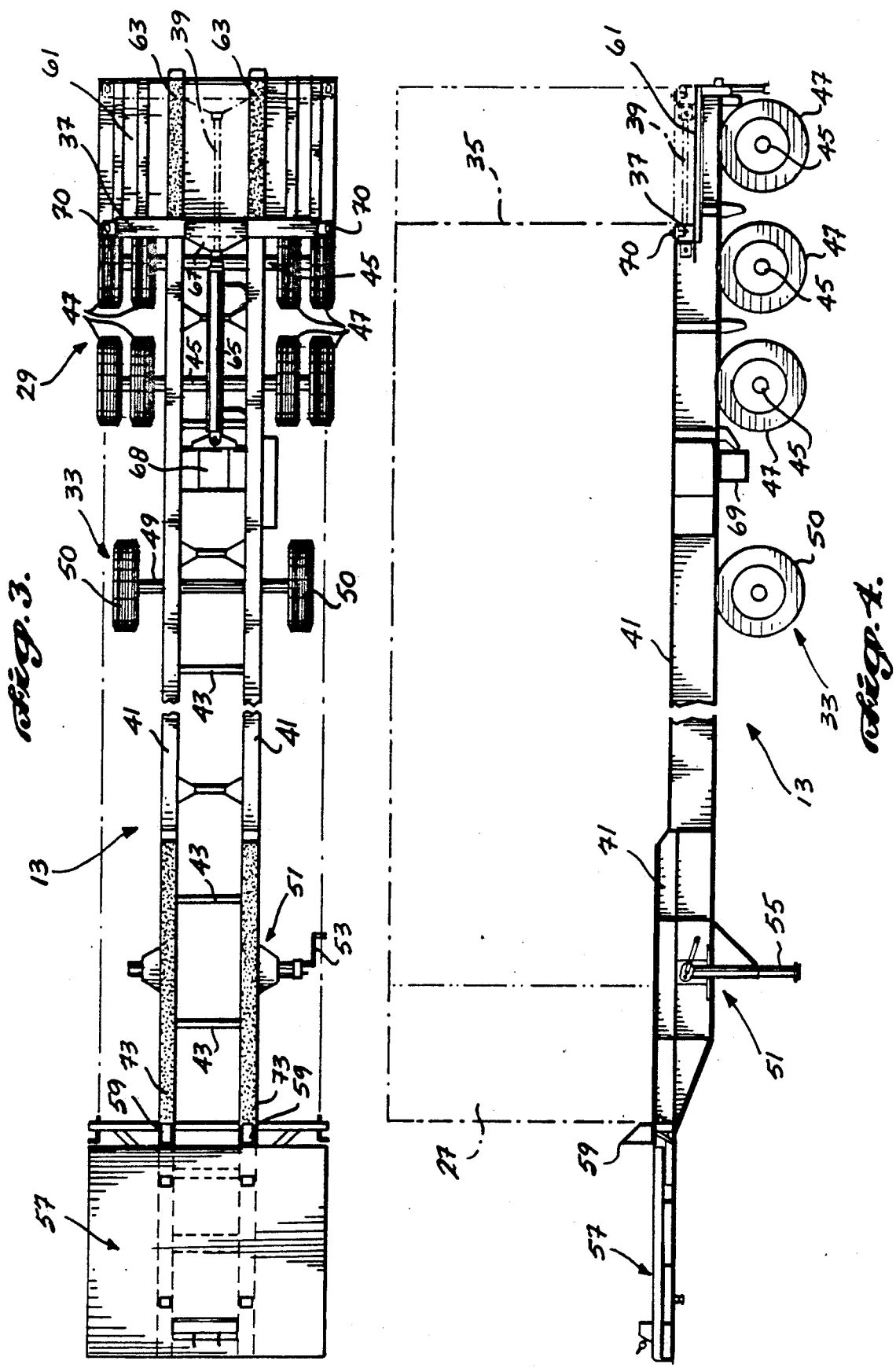

TRUCK TRAILER WITH HYDRAULIC CARGO CONTAINER POSITIONING MECHANISM

TECHNICAL AREA

This invention is directed to truck trailers and, more particularly, truck trailers for conveying large cargo containers.

BACKGROUND OF THE INVENTION

In recent years the movement of cargo between destinations, particularly, international destinations, is frequently via intermodal cargo containers. There are two standard size intermodal cargo containers—20-foot (small) containers and 40-foot (large) containers.

Typically, intermodal cargo containers are filled at a manufacturing plant. If a container is to transport different types of products, the container may be moved by a truck-trailer combination between one manufacturing location and another manufacturing location. During loading, the truck trailer is usually backed up to a loading dock, rear doors of the container are opened and cargo is moved into the container, frequently utilizing industrial moving equipment, such as forklift trucks. After being fully loaded, the truck-trailer combination moves the intermodal cargo container to a shipping port where it is loaded onboard a ship for transportation to another port, usually in a different country. Alternatively, the truck may transport the container to a railroad loading station, whereat the container is loaded aboard a flatbed railcar for transportation to an unloading station, which may be a destination warehouse or a shipping port where the container is loaded onboard a ship. After being loaded onboard a ship, if ship transportation is necessary, the container is moved to another port whereat it is unloaded and the foregoing procedures reversed as the container is transported to a warehouse where the container's cargo is unloaded and stored for distribution to distributors, sales outlets, end users, etc., as determined by the nature of the cargo.

In order to most efficiently move cargo into an intermodal cargo container at the loading dock of the manufacturing plant and remove cargo from a container at the loading dock of a warehouse, is it desirable that the rear entryway of the container be vertically aligned with the rear of the flatbed truck-trailer combination that is to transport the container. Such an alignment allows the floor of the intermodal cargo container to be positioned adjacent the floor of the loading dock without a horizontal gap existing therebetween. As a result, loading and unloading equipment, such as forklift trucks, can be driven between the floor of the container and the floor of the loading dock without the need for a gap bridging platform, e.g., a ramp. Such an alignment is also desirable in situations where the intermodal cargo container is designed to transport products at a nonambient temperature; and, the loading and unloading is done in a nonambient environment. For example, the container may be designed to transport frozen foods. In such a situation, it is desirable, and in fact may be mandatory, that a seal enclose the space between the rear entryway of the container and the entryways of the loading docks through which the frozen cargo is loaded and unloaded.

The desirability of having the rear entryway of an intermodal cargo container vertically aligned with the rear of the flatbed truck-trailer combination that is to carry the container conflicts with the way a container is to be positioned for traveling between the wheels of the trailer and the wheels of the tractor that pulls the trailer from one location to another. This positioning (which is a legal requirement in some areas of the world, namely the United States) results in the rear portion of the trailer extending beyond the rear entryway of the intermodal cargo container being transported by the trailer.

One solution to the foregoing problem is described in U.S. Pat. No. 4,580,805 entitled "Extendible Container Chassis for Trucks" by William A. Bertolini. The Bertolini patent describes an extendible truck trailer chassis having a movable rear section or extension. The extension is equipped with a gear rack whose teeth are adapted to mesh with the teeth of an idler pinion. The idler pinion is mounted on the main frame and, in turn, meshes with a similar gear rack on a cradle carried on the chassis. With the cradle located at the rear of the frame and the extension in its withdrawn position, the entryway of the container is aligned with the rear end of the chassis for unloading and loading. The sliding extension moves aft to make the chassis longer. As the extension moves aft, its rack activates the pinion and moves the cradle and its rack forward by a similar distance. As a result, a large container can be positioned in a suitable central location between the wheels of the trailer and the wheels of the tractor that pulls the trailer during transportation from one location to another.

The main disadvantage of the extendible container chassis for trucks described in the Bertolini patent is its complexity. Because the mechanism is complex, it is subject to breakdown. The present invention is directed to a hydraulic cargo container positioning mechanism suitable for use with a flatbed truck-trailer combination that is relatively uncomplicated and, thus, suitable for widespread use.

SUMMARY OF THE INVENTION

In accordance with this invention, a flatbed truck-trailer, preferably a gooseneck truck-trailer, including a mechanism for longitudinally positioning a large cargo container located atop the flatbed truck-trailer is disclosed. The load positioning mechanism includes a horizontal bar located atop the trailer, preferably near the rear thereof. The longitudinal axis of the bar lies oriented orthogonal to the longitudinal axis of the trailer. A fluid energized movement mechanism is connected to the bar. When energized, the movement mechanism slides the bar back and forth in the direction of the longitudinal axis of the trailer. In use, the cargo container to be transported by the trailer is positioned atop, and attached to, the bar. As a result, when the bar is slid back and forth, the container slides back and forth. The container slides between a loading and unloading position whereat the rear entryway of the container is vertically aligned with the rear of the trailer and a traveling position whereat the rear of the container is forward of the rear of the trailer.

In accordance with other aspects of this invention, the horizontal bar is located beneath the lower rear corner of the cargo container.

In accordance with further aspects of this invention, the fluid energized movement mechanism is a hydraulic actuator. The hydraulic actuator is horizontally oriented and positioned along the longitudinal axis of the trailer such that one end of the actuator is attached to the trailer and the other end is attached to the bar.

In accordance with further aspects of this invention, the housing of the hydraulic actuator is attached to the trailer and the tip of the shaft of the actuator is attached to the bar.

In accordance with yet still other aspects of this invention, a layer of low-friction material is located atop the trailer beneath; (i) the forward end of the container; and, (ii) beneath the bar.

As will be readily appreciated from the foregoing description, the invention provides a relatively uncomplicated apparatus for moving a cargo container, particularly a large, intermodal cargo container, between a loading and unloading position whereat the rear entryway of the container is vertically aligned with the rear of a trailer and a traveling position whereat the container is located in front of the rear of the trailer. The moving mechanism is uncomplicated, preferably including a bar attached to the lower rear corner of the container and positioned mounted atop low-friction surfaces, plus a hydraulic mechanism for moving the bar and, thus, the container between the unloading and loading and traveling positions.

BRIEF DESCRIPTION OF THE DRAWINGS

The foregoing features and advantages of this invention will become more readily appreciated as the same becomes better understood by reference to the following detailed description taken in conjunction with the accompanying drawings wherein:

FIG. 1 is an elevational view of a cargo container transporting truck trailer combination formed in accordance with this invention showing the container in a traveling position;

FIG. 2 is an elevational view similar to FIG. 1 showing the container in a loading and unloading position;

FIG. 3 is a top plan view of a gooseneck trailer with a hydraulic cargo container positioning mechanism formed in accordance with the invention; and, FIG. 4 is a side elevational view of FIG. 3.

DESCRIPTION OF THE PREFERRED EMBODIMENT

FIGS. 1 and 2 illustrate a truck-trailer combination 11 that includes a gooseneck trailer 13 formed in accordance with the invention and a tractor 15 suitable for pulling the trailer 13. The tractor 15 is attached to the gooseneck trailer 13 in a conventional manner, which does not form part of this invention. The rear end of the trailer 13 is shown in FIGS. 1 and 2 as positioned adjacent a loading dock 17. The loading dock 17 includes an entryway 19 that is vertically defined by a header or lintel 21 and a floor 23, and horizontally defined by sides (not shown). The gooseneck trailer 13 is positioned such that the rear end 25 of the trailer 13 impinges on a bumper 26 located on the outer face of the loading dock, just below the floor 23. In a conventional manner, the longitudinal axis of the trailer 13 extends orthogonally outwardly from the outer face of loading dock 17.

Mounted atop the gooseneck trailer 13 is a large (e.g., 40-foot) intermodal cargo container 27. The height of the generally flatbed of the trailer 13 is such that the floor of the intermodal cargo container 27 is horizontally coplanar with the floor 23 of the loading dock 17.

As illustrated in FIG. 1, in the traveling position, the cargo container 27 is more or less centrally positioned between three sets of tandem wheels 29 located at the rear end of the trailer 13 and the tandem wheels 31 of the tractor 15. In addition to the three sets of tandem wheels 29 located at the rear of the trailer 13, the trailer may include, if desired, a raisable and lowerable set of steering wheels 33 located between the tandem wheels and the front of the trailer, nearer to the tandem wheels. Further, while the trailer of the embodiment of the invention described herein is illustrated as having three pairs of tandem wheels, it is to be understood that the invention is equally useful with trailers having a greater or lesser number of rear wheels.

In the absence of the invention, as shown in FIG. 1, the rear entryway 35 of the cargo container 27 is spaced from the loading dock entryway 19 by a distance A. In the past, the distance A gap has been bridged by a platform or ramp so that workers and equipment could readily move back and forth between the interior of the cargo container 27 and the loading dock 17 during loading and unloading. Because ramps are dangerous and cumbersome they are undesirable. In addition, the distance A gap is undesirable when the cargo container 27 is designed to transport products at a nonambient temperature, e.g., frozen products. In such instances, a seal must be provided to enclose the space between the rear entryway 35 of the cargo container 27 and the entryway 19 of the loading dock 17.

The present invention is directed to providing a mechanism for avoiding the foregoing problems and disadvantages. As illustrated in FIG. 2, the problems and disadvantages are avoided by providing a mechanism for moving the container 27 rearwardly across the distance A gap until the rear entryway 35 of the cargo container 27 meets the entryway 19 of the loading dock 17. As generally illustrated in FIGS. 1 and 2 and shown better in FIGS. 3 and 4, the mechanism includes a horizontally oriented bar 37 located beneath the lower rear edge of the cargo container 27. The bar 37 is moved forwardly and rearwardly by an actuator mechanism, preferably a hydraulic actuator.

As best illustrated in FIGS. 3 and 4, the gooseneck trailer 13 includes a pair of spaced-apart beams 41 located on opposite sides of the longitudinal centerline of the trailer. The beams 41 are rigidly attached to one another by spaced-apart, orthogonally oriented braces 43. Preferably, the braces 43 are welded to the beams 41. Located at one end of the beams 41 (the rear end of the trailer 13) are the three sets of tandem wheels 29. Each set of wheels includes an axle 45 and four tires 47 mounted on the axle, two located on each side of the beams 41. The beams 41 support the axles 45 which, in turn, support the tires 47. Located inwardly, i.e., toward the front end of the trailer 13 from the sets of tandem wheels, are the steering wheels 33. The steering wheels 33 include an axle 49 that can be raised and lowered and a pair of tires 50, one mounted on either end of the axle 49. When lowered, the steering wheels 33 are used to assist in changing the direction of movement of the trailer 13 at low speeds. Since the steering wheels 33 do not form the present invention, they will not be described further.

Located in front of the steering wheels 33 is a retractable landing gear mechanism 51. In a conventional manner, the retractable landing gear mechanism includes a hand crank 53 that is used to raise and lower legs 55 that are used to support the front end of the trailer 13 when the trailer is not attached to a tractor 15. Located at the front end of the trailer 13 is a gooseneck platform 57 that houses a conventional mechanism for attaching the trailer 13 to a tractor 15. Located at the rear end of the platform 57 are a pair of bumpers 59 against which the front end of a container 27 rests when the container is in its forwardmost position.

When a container 27 is in its forwardmost position atop the gooseneck trailer 13, the bar 37 is at the frontmost edge of a deck 61 located at the rear end of the trailer 13. When in this position, the rear entryway 35 of the container 27 is positioned slightly behind the axle 45 of the center set of tandem wheels located at the rear end of the trailer 13. Located atop the deck 61 are a pair of strips 63 formed of a low-friction material, such as molyfilled nylon. The longitudinal axes of the strips 63 lie parallel to the longitudinal axis of the trailer 13 and on either side thereof. Further, the strips 43 lie beneath the bar 37 and provide a low-friction surface over which the bar 37 moves as the shaft 39 of the hydraulic actuator 65 that moves the bar is extended and retracted. More specifically, the outer tip of the shaft 39 of the hydraulic actuator 65 is attached via bracket 67 to the midpoint of the bar 37. The other end of the housing of the hydraulic actuator 65 is attached to a bracket 69 that is affixed to, and extends between, the beams 41 of the trailer 13. Preferably, the bracket is welded to the beams 41. The bracket 69 is located slightly in front of the frontmost set of tandem wheels. Since the bracket 69 is fixed, when the hydraulic actuator 65 is energized by a suitable source of pressurized hydraulic fluid, so as to extend the shaft 39 of the actuator, the bar 37 slides toward the rear of the trailer 13. The source of pressurized hydraulic fluid may be provided by a hydraulic pump (not shown) housed in a box 69 attached to the beams 41, or a power take-off unit mounted on the tractor 15.

The container 27 is mounted on the trailer such that the lower rear corner of the container lies atop the bar 37. The container is attached to the bar by any suitable locking mechanism 70. As a result, as the bar 37 is moved back and forth as the shaft 39 of the actuator 65 is extended and retracted, the container 27 is slid back and forth. At its rearmost position, the rear entryway 35 of the container 27 is vertically aligned with the rear of the gooseneck trailer 13.

The other end of the container 27, i.e., the end nearest the front of the trailer 13, lies atop upwardly protruding regions 71 of the beams 41. The upwardly protruding regions 71 extend into longitudinal slots formed in the bottom of the container 27. Attached to the upper surfaces of each of the upwardly protruding regions 71 is a strip of low-friction material 73, such as molyfilled nylon, for example. The strips of low-friction material allow the container 27 to more easily slide back and forth between its traveling position shown by the darker dash lines in FIG. 4 and its loading and unloading position shown by the lighter dash lines as the bar 37 is moved back and forth by the hydraulic actuator 65.

As will be readily appreciated from the foregoing description, the invention provides an uncomplicated mechanism for moving a cargo container, particularly a large (e.g., 40-foot) intermodal cargo container between a loading and unloading position and a traveling position. The upwardly protruding regions 71 of the beam and the container slots in which they reside prevent sideways movement of the container as the container is slid back and forth. If desired, a further lockdown mechanism, located at the front of the container, for example, can be used to further assist in preventing movement of the container during transportation.

While a preferred embodiment of the invention has been illustrated and described, it will be appreciated that various changes can be made therein without departing from the spirit and scope of the invention. For example, fluid powered mechanisms other than hydraulic mechanisms can be used to move the beam and, thus, the container between loading and unloading, and traveling, positions, if desired. Alternatively more than one hydraulic actuator can be used to move the bar 37. For example, a pair of side-by-side hydraulic actuators can be used to move a single bar, or another bar and hydraulic actuator can be added to assist the single bar/actuator combination described above. Also the single bar/actuator combination can be located in positions other than the position described above and illustrated in the drawings. For example, a single bar/actuator combination could be located beneath the front end, or beneath the center of the container. Consequently, within the scope of the appended claims it is to be understood that the invention can be practiced otherwise than as specifically described herein.

The embodiments of the invention in which an exclusive property or privilege is claimed are defined as follows:

1. In a wheeled vehicle of fixed length for transporting between destinations a large cargo container having a cargo entryway located at one end, said wheeled vehicle including an elongate frame and a set of wheels, said set of wheels being immovably attached to said frame at a fixed position adjacent to one end of said elongate frame, the improvement comprising a positioning mechanism located beneath said large cargo container for sliding said large cargo container along the longitudinal axis of said elongate frame of said wheeled vehicle between: (i) a loading and unloading position whereat said end of the cargo container containing a cargo entryway is vertically aligned with said one end of said frame of said wheeled vehicle; and, (ii) a traveling position whereat the container is longitudinally load centered between the wheels of the said wheeled vehicle, said positioning mechanism including: a horizontal bar positioned beneath said container such that the longitudinal axis of said bar lies orthogonal to the longitudinal axis of said wheeled vehicle; an attachment mechanism for attaching said horizontal bar to said container; and, a fluid powered movement mechanism for moving said bar along the longitudinal axis of said wheeled vehicle.

2. The improvement claimed in claim 1, wherein said fluid powered movement mechanism is a hydraulic actuator.

3. The improvement claimed in claim 1 or 2, wherein said bar is also positioned beneath the end of said cargo container that is vertically aligned with the end of said vehicle when said cargo container is in said loading and unloading position.

* * * * *

UNITED STATES PATENT AND TRADEMARK OFFICE
CERTIFICATE OF CORRECTION

PATENT NO. : 5,026,228
DATED : June 25, 1991
INVENTOR(S) : P. Michael Mansfield It is certified that error appears in the above-identified patent and that said Letters Patent is hereby corrected as shown below:

Title Page:

COLUMN  LINE

[73]  Assignee  After "[54] TRUCK TRAILER WITH HYDRAULIC CARGO CONTAINER POSITIONING MECHANISM" insert
--[73] Assignee: Busby International, Inc. Moses Lake, Washington--

Signed and Sealed this

Twenty-third Day of March, 1993

Attest:

STEPHEN G. KUNIN

*Attesting Officer*    *Acting Commissioner of Patents and Trademarks*